Nov. 22, 1966   K. A. BROWNE   3,286,657
RAILWAY-HIGHWAY VEHICLE TRUCK
Filed Aug. 13, 1963   6 Sheets-Sheet 1

INVENTOR.
KENNETH A. BROWNE
BY Williams, David
Hoffmann & Yount
ATTORNEYS

Nov. 22, 1966  K. A. BROWNE  3,286,657
RAILWAY-HIGHWAY VEHICLE TRUCK
Filed Aug. 13, 1963  6 Sheets-Sheet 2

INVENTOR.
KENNETH A. BROWNE
BY Williams, David
Hoffmann & Yourt
ATTORNEYS

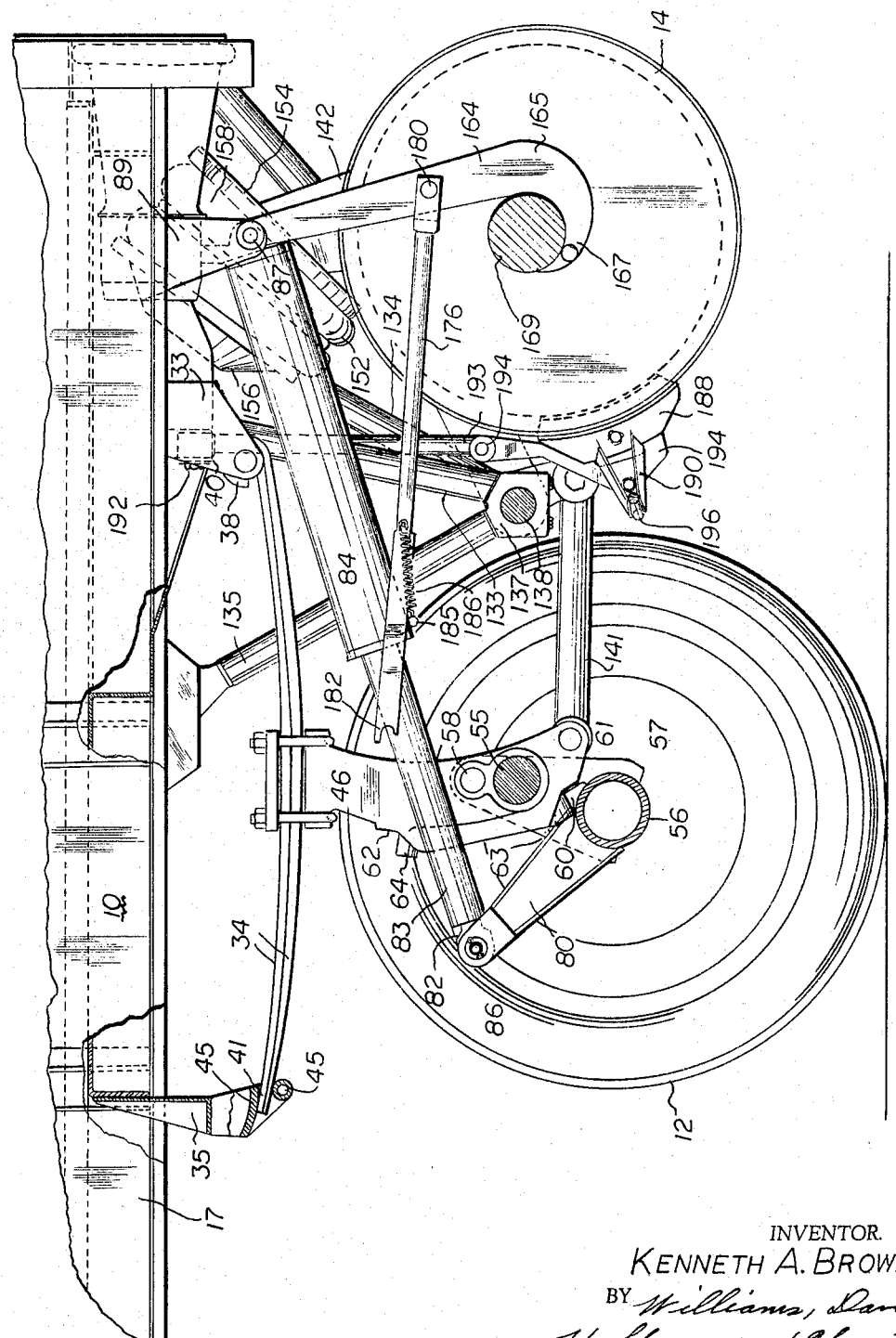

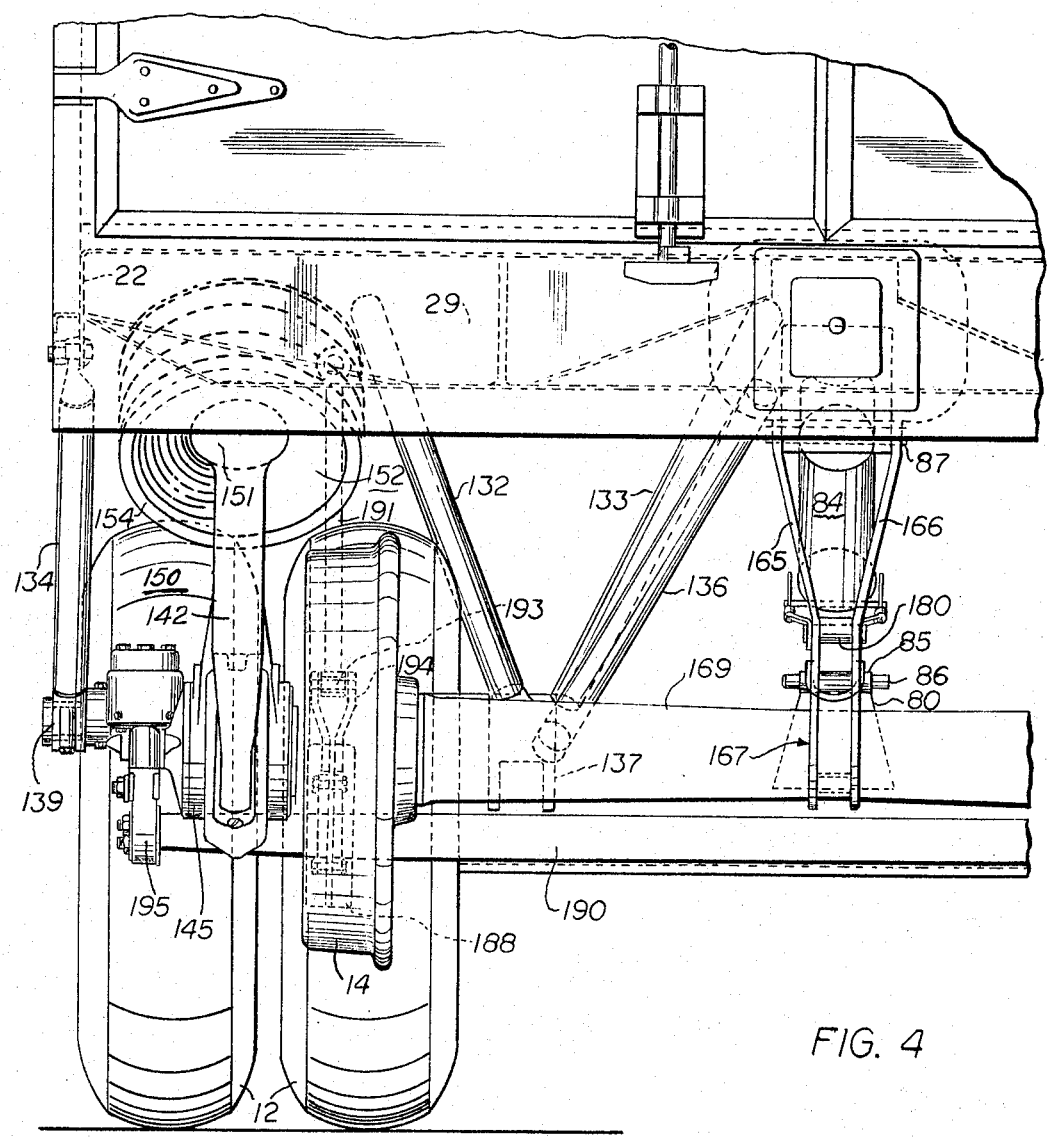

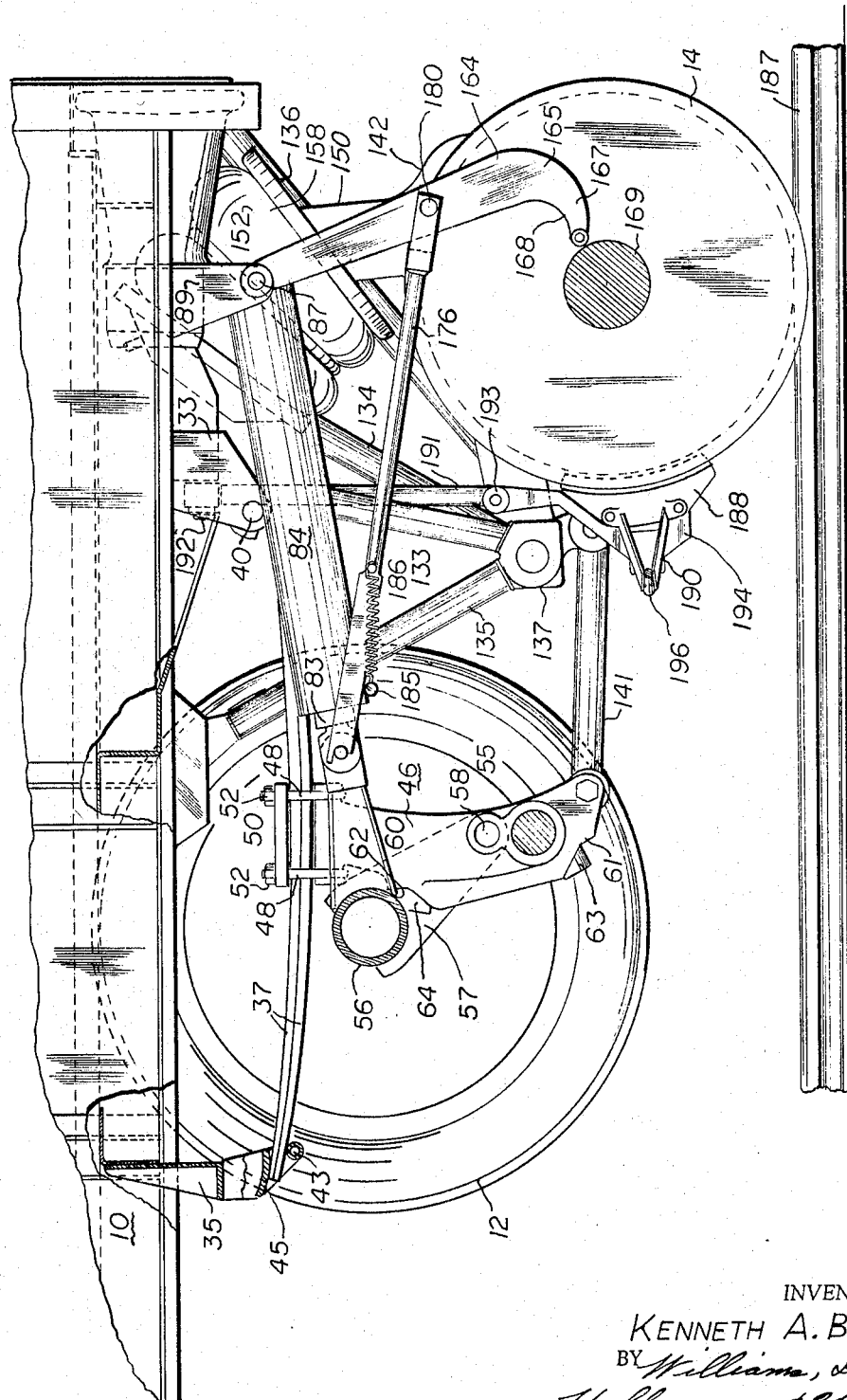

Nov. 22, 1966  K. A. BROWNE  3,286,657
RAILWAY-HIGHWAY VEHICLE TRUCK
Filed Aug. 13, 1963  6 Sheets-Sheet 6
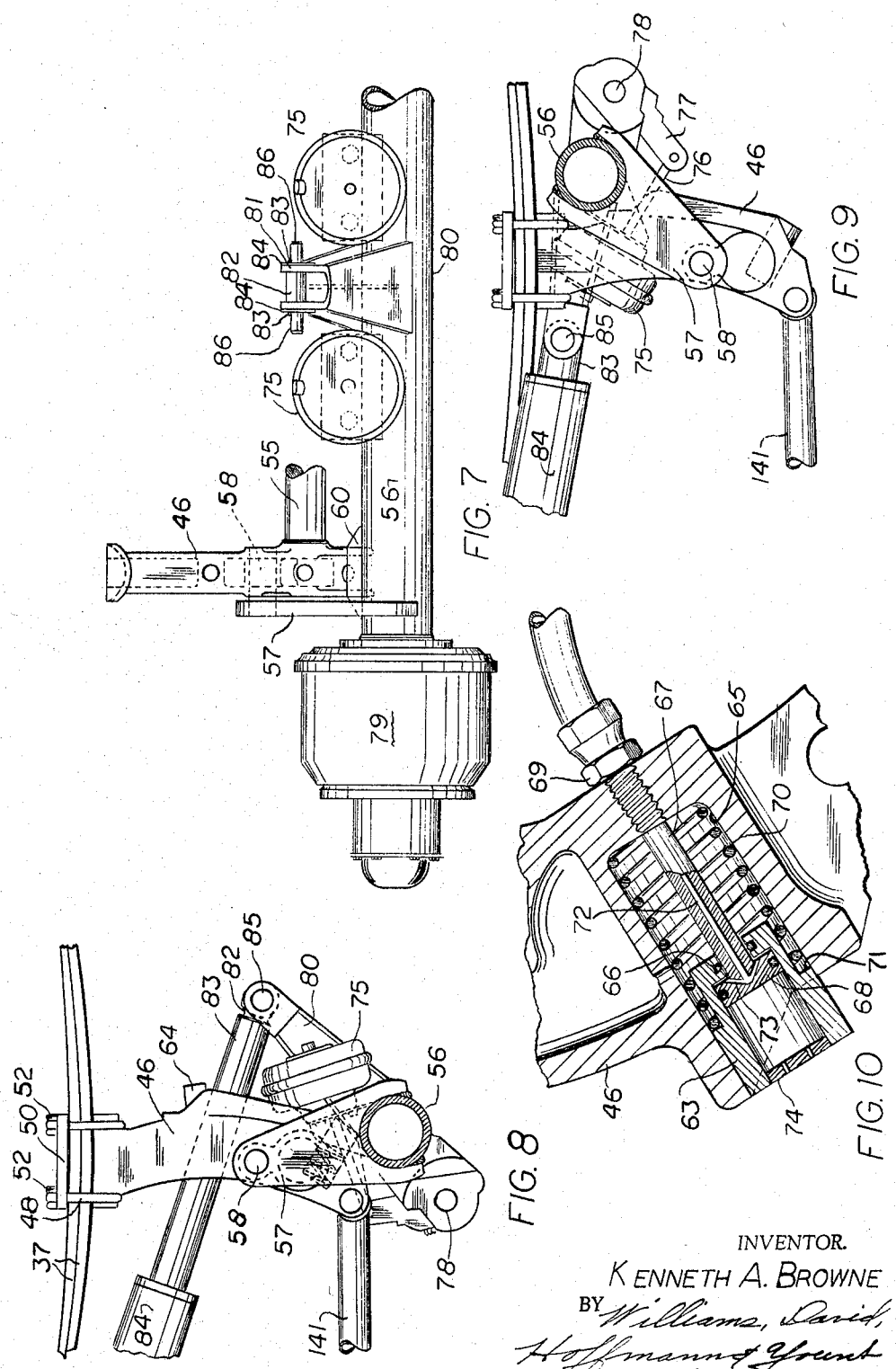
INVENTOR.
KENNETH A. BROWNE
BY Williams, David,
Hoffmann & Grant
ATTORNEYS

United States Patent Office 3,286,657
Patented Nov. 22, 1966

3,286,657
RAILWAY-HIGHWAY VEHICLE TRUCK
Kenneth A. Browne, Lakewood, Ohio, assignor to The Chesapeake and Ohio Railway Company, Cleveland, Ohio, a corporation of Virginia
Filed Aug. 13, 1963, Ser. No. 301,811
16 Claims. (Cl. 105—215)

This invention relates to vehicles adapted to travel either on pavements or on railway rails and more particularly to wheel suspension systems for such vehicles in which the road wheels and rail wheels are selectively brought into a load carrying position.

An object of this invention is to provide a novel and improved wheel suspension for a road-rail vehicle having selectively usable sets of road wheels and rail wheels and means for positioning the sets of wheels in load carrying position.

Another object of this invention is to provide a novel and improved wheel suspension of the character referred to comprising a commercial road-wheel axle assembly in combination with means for selectively pivoting the standard axle assembly from a terminal road operating position to a terminal retracted position and preferably including means for locking the axle assembly in each of its terminal positions.

Another object of this invention is to provide a novel and improved wheel suspension of the character referred to for a road-rail vehicle in which at least one set of wheels is moved into inoperative position with the aid of the weight of the vehicle and in which position they are locked when not in use.

Another object of this invention is to provide a novel and improved wheel suspension of the character referred to for a road-rail vehicle and which includes means for pivotally moving the road-wheel axle relative to the vehicle and unlocking the rail wheels as the road wheels approach their terminal disengaged position.

A further object of this invention is to provide a novel and improved wheel suspension of the character referred to for a road-rail vehicle having means for pivoting one set of the wheels into operating position and which also serves as a suspension spring means between the wheels and the vehicle framework.

A still further object of this invention is to provide a novel and improved wheel suspension of the character referred to having pneumatic means for moving the rail wheels which pneumatic means acts as an air-spring when the vehicle is used as a rail vehicle.

A still further object of this invention is to provide a novel and improved wheel suspension of the character referred to for a road-rail vehicle which suspension includes a differential actuator to move the road wheels selectively to their terminal road-operating position and to their terminal retracted position, which actuator is capable of exerting a greater force when moving the road wheels into their road-operating position than when moving the road wheels into their terminal retracted position.

A still further object of this invention is the provision of a novel and improved wheel suspension of the character referred to in the preceding paragraph having spring means in the connection of the actuator to the road engaging wheels and the vehicle frame structure, which spring means acts as vibration absorption means and thereby prevents undue wear of the actuator.

In converting road-rail vehicles from road type to rail type and vice versa, different vehicle heights are preferred. When the vehicle is used as a road type, the floor should be of the order of 52 inches from the ground to receive loads from standard platforms. When the vehicle is used as a rail type, however, the middle of the vehicle coupler should be of the order of 35 inches from the top of the rail for increased stability of the train connected vehicles in negotiating curves, etc., and so that the front vehicle may be readily coupled to a conventional engine. In meeting these different height requirements by a novel suspension system of this invention, different force requirements are imposed on the actuator which causes the conversion. A greater actuator force, for example, is required to move the road wheels into their terminal road operating position than in moving these wheels to their terminal retracted position because the actuator must move the road wheels downwardly a sufficient distance to raise the weight of the vehicle body and its load off of the rail engaging wheels.

Briefly, in accordance with this invention, a road wheel axle assembly, preferably a commercially available one, is pivotally connected to the vehicle frame assembly or frame structure and a hydraulic actuator is employed to pivot the axle assembly relative to the frame structure. This hydraulic actuator includes a double acting piston arrangement in which a first actuator piston is employed to move the road wheels into road engaging position, which actuator piston has a relatively large cross-sectional area and a second actuator piston having a relatively smaller cross-sectional area is employed to retract the road wheels. This novel device satisfies the requirement that the force employed to move the road wheels into road operating position must be sufficient to raise the weight of the vehicle off of the rail wheels and provides, with a minimum of additional parts, the smaller force required to retract the road wheels. Still another advantage of the novel double acting actuator is the use of a spring which absorbs road vibrations and prevents or reduces movement of the fluid seals of the actuator, which movement would otherwise cause excessive wear of the piston seals.

In accordance with other aspects of this invention, a rail axle engaging lock or hook is connected to the vehicle frame and is controlled by the hydrauic actuator for the road wheels in a manner to lock the rail wheels in a terminal retracted position and to unlock the rail wheel axle when the vehicle is lowered into a rail engaging position. The pivoting of the rail wheel axle is also controlled by bellows-like pneumatic bags which act as air springs for the rail wheel axle when the rail wheels are in engagement with the rails.

In accordance with still other aspects of this invention, the vehicle frame structure is provided with road wheel spring supports, road wheel springs, struts, etc., by which the road wheel axle is pivotally supported and at least one pair of locking means for locking the road wheel axle in each of its terminal positions. Advantageously, these locking means can be spring biased to locking position and remotely actuated to release the road wheel axle by suitable power means such as hydraulic cylinder-piston combinations. In other words, hydraulic fluid can be employed to overcome the biasing springs which normally retain the locking means in a road axle engaging position.

It is a still further feature of this invention to employ rail wheel supports or arms pivotally to mount the rail wheels on the vehicle frame structure for movement independently of the road wheels. This pivotal support means engages the air springs secured to the vehicle frame structure. The air spring means receives air from a suitable air source, such as a reservoir, and is employed to move the rail wheel support or arm in a direction to bring the rail wheels into their rail engaging or operating position. The air springs, as previously mentioned, also act as a shock absorber when the vehicle is operating as a rail vehicle.

It is a still further feature of this invention to connect the highway or road axle assembly to a pair of spring mounted pedestals by means of a pair or more of suspension members, secured to the axle of the assembly and pivotally connected to one of the pedestals. A lever secured to the axle is coupled to the piston rod of the actuator by means of a pin. This pin serves the additional purpose of controlling the rail axle engaging hook or locking means which locks the rail axle in its retracted position.

These and various other objects and features of the invention will be more clearly understood from the following detailed description of the preferred embodiment of the invention described in conjunction with the accompanying drawings forming a part of this specification and in which:

FIG. 3 is a vertical sectional view taken through the apparatus on section line 3—3 of FIG. 1;

FIG. 4 is a rear view of the apparatus of FIG. 1;

FIG. 5 is a vertical sectional view similar to that of FIG. 3, but showing the rail wheel in a rail engaging position and the road wheel in its terminal retracted position;

FIG. 6 is a sectionl view of the hydraulic actuating assembly employed to actuate the road wheel pivoting movement;

FIG. 7 is a fragmentary elevational view showing a portion of the highway axle assembly and its pivotal connection to the pedestal;

FIG. 8 is a side view, partly in section, of the highway axle assembly and pedestal, showing the axle in the terminal road engaging position;

FIG. 9 is a side view, partly in section, of the highway axle assembly with the axle in its terminal retracted position; and FIG. 10 is a fragmentary vertical sectional view through the lower end of one of the pedestals associated with the highway axle assembly.

Figure 1:
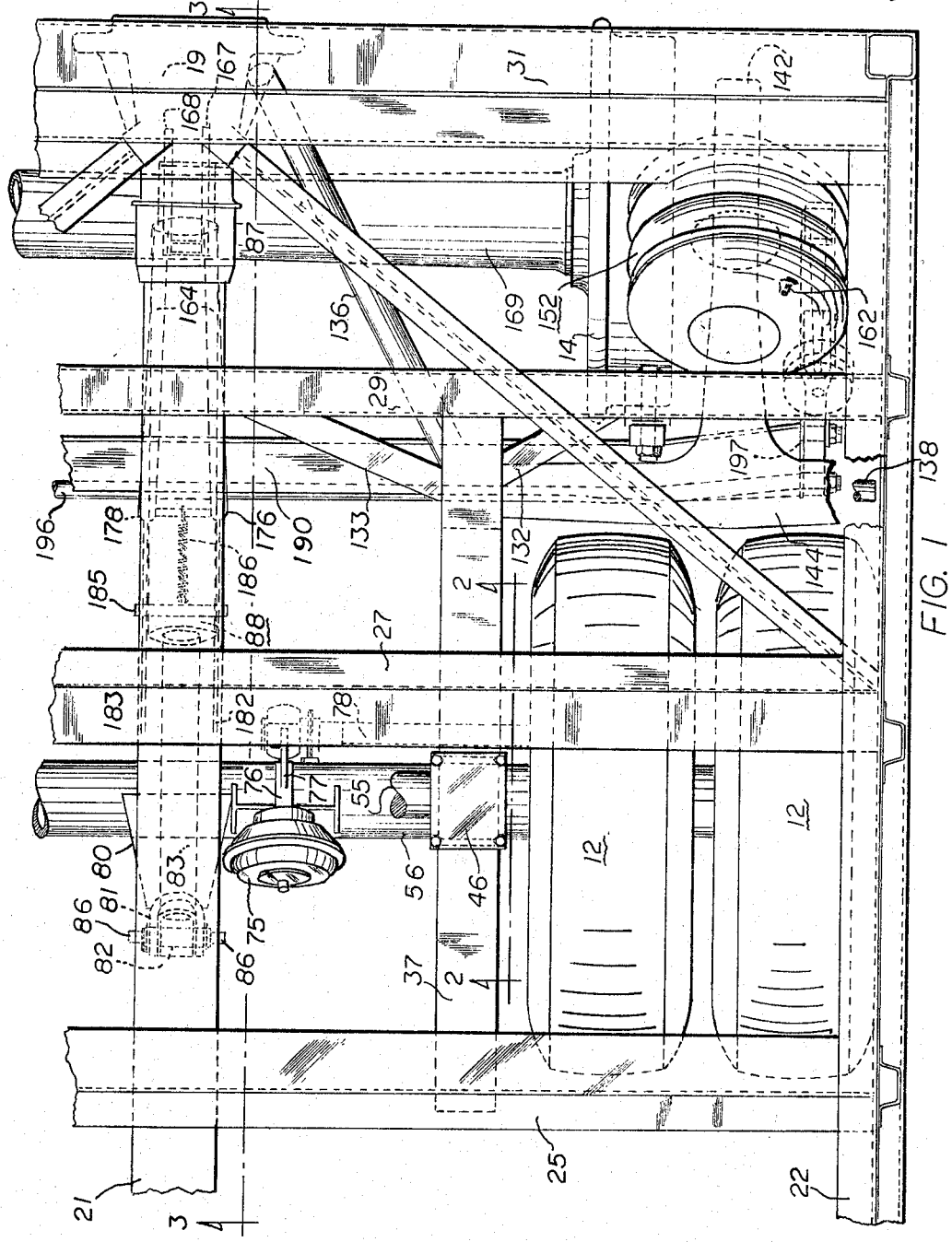
FIG. 1 is a fragmetary plan view, partly broken away, of the preferred embodiment of this invention and showing the general arrangement of the components.

Referring to the drawings, there is shown therein the rear portion of a road-rail vehicle 10 having a rear wheel suspension system incorporating this invention and including a set of road wheels 12 and a set of rail wheels 14, which enable the vehicle to operate either on a road or pavement or on the rails of a conventional railroad. The vehicle 10 shown is a load vehicle having a van-type body 16 supported by a frame structure 17 having front and rear couplers such that a plurality of the vehicles can be connected into a train for operation on the rails. The front end of the vehicle may be supported either by engagement of the front coupled (not shown), in a rear coupler 19 of a similar vehicle when the vehicles are in a train relationship, or by a suitable strut device (not shown) when individual vehicles are disconnected from the train and are left standing in a parked relation. The front end of vehicle 10 can also be connected by suitable means, not shown, with a road traction unit and operated on a road or pavement as a van or truck.

The vehicle frame structure 17 can be of any suitable construction and is here shown as comprising a longitudinal center sill 21 and longitudinal side sills 22 interconnected by transverse members including intermediate members 25, 27 and 29 and a rear end member 31.

The road wheel suspension system includes a pair of leaf springs 37, one at either side of the vehicle, mounted on longitudinally spaced brackets 33 and 35 forming part of frame 17 and connected to and projecting downwardly from the cross members 25, 29. The rear end portions of the springs 37 are wrapped around cylindrical pins 40 in the rear brackets 33 and the opposite ends are slidably mounted between a spring retaining pin 43 and a plate 45 of the bracket 35. The construction is such that the front ends of the springs 37 are free to slide relative to the brackets 35, when the springs are flexed.

The springs 37 are provided midway between their ends with highway or road wheel axle suspension pedestals 46 secured to the springs 37 by means including pairs of U-bolts 48 which encircle the springs and have upwardly extending arms which project through clamping plates 50 and are provided with nuts 52 which secure the parts together. The loop portions of the U-bolts 48 are engaged in notches 54 of the pedestals 46. For transverse stability, pedestals 46, at opposite sides of the vehicle, are connected together by a suitable cross-brace 55. As mentioned above, the suspension system is in all essential respects symmetrical with respect to the longitudinal centerline of the vehicle and the details of construction of the suspension system are identical on the opposite side of the center sill.

The highway or road axle assembly includes an axle 56 to which the pneumatic tired road wheels 12 are rotatably connected, is pivotally coupled to the pedestals 46 by a pair of axle suspension members or levers 57 having their one ends secured to the road wheel axle 56 as by welding and their other ends pivotally connected to a pair of cylindrical pins 58 secured in and projecting from the pedestals 46. The pins 58 are not required to support the vehicle, but are merely required to support the weight of the road axle assembly including the road wheels.

Figure 2:
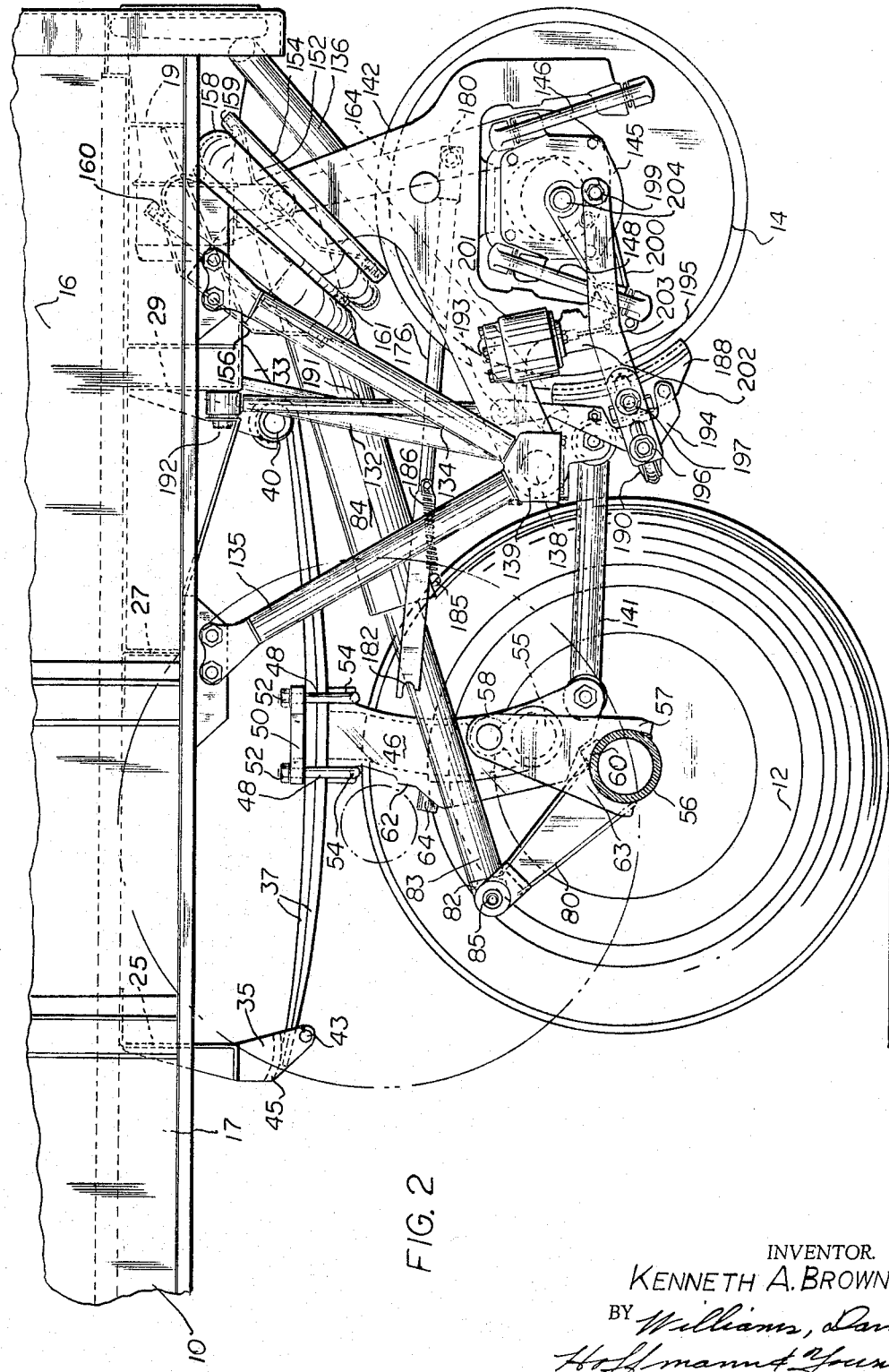
FIG. 2 is mainly a side elevational view of the apparatus of FIG. 1, but with the highway axle assembly in section on line 2—2 of FIG. 1, and the brake actuating mechanism omitted.

When the road wheels 12 are in a road-engaging position, FIGS. 2 and 3, the vehicle is supported by means of a pair of triangular axle wedges 60 secured to axle 56 which abut against flat surfaces 61 on the suspension pedestals 46. When the road wheels are in their terminal retracted position, see FIG. 5, the wedges 60 engage surfaces 62 on the suspension pedestals 46. In each of its terminal positions the road axle 56 is locked by means of locking pins 63 and 64, respectively, which engage the wedges 60, as best seen in FIGS. 2, 3 and 5.

The locking pins 63, 64 are parts of duplicate assemblies, all of which are supported in the members 46 in a similar manner. Referring to FIG. 10, the locking pin 63 is a cylindrical, tubular member slidably supported in an aperture 65 in the member 46 and having an internal flange 66 on its right-hand end movable along a fixed piston rod 67 projecting into the aperture from the right and fixed in the closed right-hand end of the aperture as by being threaded through a small aperture therein from the left. The piston rod 67 has an enlarged head 68 on its right-hand end which head may be provided with a suitable connection for driving the piston rod into the member 46. The piston rod may be locked in the member 46 by a jam nut 69. A coil spring 70 surrounding the right-hand portion of the member 63, which end is of reduced diameter and abuts against a shoulder 71 on the member 63 formed by the reduction in diameter, referred to, and the bottom of the aperture 65, biases or yieldably urges the member 63 to locking position.

The locking member 63 is selectively retracted to inoperative position by the admission of fluid under pressure into the chamber between the left-hand side of the piston head 68 and the right-hand side of the internal flange 66 on the locking member 63 through suitable conduits including the bores 72 and 73 leading from the right-hand end of the piston rod 67 to the right-hand side of the piston head 68. The left-hand end of the tubular lock 63 is preferably closed by a suitable plug 74 for preventing the entrance of foreign matter. The plug 74 is provided with small apertures to allow for the ingress and egress of air into the interior of the member 63 and a suitable vent is also provided for the chamber or part of the aperture 65 to the right of the member 63. O-rings are employed in the piston head 68 and the internal flange 66 to prevent the escape of fluid between the piston head 68 and the interior of the member 63 and the piston rod 67 and the flange 66, respectively. Locking pins 63, 64 are spring biased into axle wedge engaging positions but may be selectively retracted by hydraulic fluid actuated pistons connected to the locking pins.

The road axle assembly is, as previously stated, of a conventional type and has a conventional brake system including a pair of brake cylinders 75, each connected by a link 76, see FIG. 9, to an associated brake lever arm 77, which is connected to a suitable brake-actuating shaft 78 projecting into the brake mechanism, not shown, but located within the brake drum 79. The brake mechanism within the brake drum 79 may be of any conventional form.

The road axle assembly is selectively transferred or moved from operating, that is, road engaging position to inoperative or retracted position by a transfer lever 80 having its one end fixedly secured to the road axle 56 and its opposite end, which terminates in a U-shaped fork 81, pivotally secured to an eyebolt 82 fixed to the projecting end of piston rod 83 of a reciprocating-type hydraulic motor or actuator 84 by a cylindrical pin 85 passing through fork 81 and the eye of the bolt 82. The intermediate portion of pin 85, that is, the portion between the forks of the member 81, is enlarged and is acted upon by the eyebolt of the hydraulic actuator device 84 to pivot the road axle assembly about the pins 58. The outer or end portions 86 of the pin 85 are employed to control the locking and unlocking of the rail wheel axle in its retracted position in a manner which will be subsequently described.

The hydraulic actuator device 84, which moves the road wheel assembly between its terminal positions, is a double-acting cylinder device connected between the road axle transfer lever 80 and a pin 87 on bracket 89 of the vehicle frame structure 17, which pin extends through an eye 90 on the rear end of the main exterior cylinder 91 of the actuator. The actuator device 84, shown in detail in FIG. 6, selectively elongates and retracts to respectively lower and retract the road axle assembly including the road wheels 12 in response to the selective supplying of fluid under pressure thereto. Piston rod 83 is slidably mounted in cylinder assembly 91, which assembly includes a hollow or tubular inner piston guide 92 connected to the rear or right-hand end of the cylinder assembly and projecting into the piston rod 83 which is also tubular and constitutes or forms an inner cylinder. An inner cylinder gland is positioned in the rear or right-hand end of the piston rod 82 to provide a fluid seal between the inner cylinder, that is, the piston rod 83 and inner piston guide 92. The seal includes an O-ring 93 on a gland retainer 94, and O-rings 95 and 96 on inner cylinder gland 97. The entire seal is held in position by means of inner gland nut 99 threaded into the right-hand end of the member 92. The actuator piston 100 is secured to the exterior of piston rod or inner cylinder 83 and with the inner gland assembly, just referred to, defines a piston which slides within the cylinder body 91 and occupies the entire cross section of the inside of cylinder 91 except for the piston guide 92.

Actuator piston 100 is secured to the piston rod 83 by an internal flange which projects inwardly between the righthand end of the member 83 and a flanged tubular nut 101 threaded into the adjacent end of the member 83. Fluid is prevented from leaking between the member 83 and the piston 100 by an O-ring 102 and between the piston 100 and the cylinder 91 by an O-ring 103. An inner cylinder piston 104 is mounted on the end of inner piston guide 92 and an O-ring 105 carried thereby defines a fluid seal between the actuator inner cylinder 83 and piston 104. The eyebolt 82 is connected to actuator inner cylinder or piston rod 83 by means of cylinder rod and nut 106, which encircles the actuator cylinder rod end or eyebolt 90 and is threaded into the left-hand end of the piston rod 83.

A helical spring 108 is compressively positioned between a shoulder on the nut 106 formed by an internal flange and a retainer nut 109 threaded on the extreme end of the shank of the eyebolt 83 to absorb vibrations reaching the eyebolt 82 from the road wheels 12, which vibrations would in the absence of spring 108, be transmitted to the various fluid seals within the actuator cylinder assembly. If these vibrations were not absorbed, they would cause early failure of the actuator cylinder assembly. The actuator cylinder body 91 is maintained in fluid sealing relationship with the inner cylinder or piston rod 83 by means of wiper seal retaining ring 112, wiper scraper seal 113, cylinder stop retaining ring 114, all assembled together by screws 111.

A suitable hydraulic conduit 115 is coupled to a fitting 116 which terminates in the interior of cylinder body 91. Actuator 84 is actuated by the introduction of fluid under pressure through conduit 115 from a suitable source, such as a pump or reservoir, not shown. The introduction of this fluid causes the piston 100 and inner cylinder or piston rod 83 to move away from the end of the cylinder body assembly connected to the pin 87, that is, the end to which fitting 116 is connected and thus extend the piston rod 83, thereby moving the road axle 56 into its terminal road operating position. As the road axle approached its terminal road-operating position, axle wedges 60 engaged the outer surfaces of locking pins 63 with sufficient force to overcome the force of springs 70, and depress pins 63 until the then rear surfaces of wedges 60 abutted surfaces 61 on the pedestals 46 permitting pins 63 to be returned or be restored to their road axle locking position by the springs 70.

When the road wheels are in a road engaging position and it is desired to retract the road wheels and bring the rail wheels into rail engaging position, i.e. from the position shown in FIGS. 1–4 to the position shown in FIG. 5, the locking pins 63 are first retracted. Thereafter fluid under pressure is introduced into the actuator 84 through a conduit 117 connected to the interior of the position guide 92, the left-and end of which is connected through passage 121 in the inner cylinder position 104 to the inner chamber 123 which is the road wheel retracting chamber. Because the vehicle frame structure and its load are being lowered, a lesser force is required to retract the road wheels than to actuate or advance the road wheels into a road operating position which requires lifting the vehicle frame structure to the required height. As previously described, the concentric inner cylinder piston 104 provides sufficient cross-sectional area to develop the required retracting force in response to the introduction of fluid under pressure to chamber 123, to retract the wheels.

When the road wheels are being retracted, the cooperation of the road axle wedges 60 and locking pins 64 is similar to the above described cooperation of the wedges 60 and pins 63. Wedges 60 engage the outer surfaces of pins 64 and overcome the opposing force of springs 70, depressing pins 64 until wedges 60 abut surfaces 62 whereupon pins 64 move under the force of springs 70 into their road axle locking position in engagement with the lower surfaces of wedges 60.

The railway running gear is symmetrical about the longitudinal center line of the vehicle and is pivotally mounted on a portion of the vehicle frame structure, which portion includes a number of rigid members such as rods 132, 133, 134, 135 and 136. These rods extend downwardly from the longitudinal transverse frame members, as best seen in FIGS. 1 and 4. The upper ends of rods 132 and 133 are connected to transverse member 29, rod 136 to end member 31, and roads 134 and 135 to longitudinal sill 22. The lower ends of rods 132, 133 and 136, at opposite sides of the vehicle, terminate in hub members 137, while rods 134 and 135, at opposite sides of the vehicle, terminate in hub members 139. This portion of the vehicle structure further includes a transverse rod member 138 mounted in and extending through the hub members 137 and 139, at opposite sides of the vehicle, and which acts as a fulcrum about which the rail wheel running gear pivots. For longitudinal stability, each inboard hub 137 is linked by a stabilizing link 141 to adjacent pedestal 46.

The railway running gear includes a pair of rail wheel arms 142 which terminates in an elongated substantially cylindrical member 144 encircling and in rotatable relationship with rod 138. Rail wheel journal boxes 145 are suspended by pairs of links 146 and 148 from the rail wheel arms 142. The details of this journal box and the journal box suspension may be identical with the suspension and journal box described in my Patent No. 2,889,785, issued June 9, 1959. On the remote end of each rail wheel running arm 142, a member 150 extends in an upwardly direction substantially at right angles to the major portion of the rail wheel arm and terminates in a ball portion 151 which engages an air spring means 152 secured to the vehicle frame structure 17. The air spring means 152 assists in the retraction of the railway running gear, prevents the rear axle from bouncing when the rear axle is locked in a retracted position and serves the additional purpose of acting as a shock absorber while the rail wheels are in their rail engaging position.

Each air spring 152 includes a pair of end plates 154 positioned to be engaged by the ball-shaped ends 151 of the rail wheel arms 150 and end plate 156 mounted on the under side of the vehicle frame structure 17. Each air spring 152 includes a bellows-like member 158 made of rubber or other suitable flexible material secured to plates 154 and 156 by separate annular rings 159 and 160 which secure the ends of the bellows member therebetween and one of the end plates 154 and 156. A ring 161 encircles bellows 158 to limit the movement of the bellows in a direction transversely of its axis. A suitable air inlet 162 is provided for each air spring 152, preferably through end plates 156. Air from a suitable source, such as a pump or reservoir (not shown) is selectively supplied under pressure to the interior of air springs 152 in a manner which will be subsequently described.

As best seen in FIGS. 3, 4 and 5, a rail axle locking J-hook assembly 164 is suspended by a pin 87 from bracket 89. The J-hook 164 shown includes a pair of substantially parallel arms 165 and 166, which arms terminate in hook-shaped portions 167 which have interior surfaces 168 shaped to engage the periphery of the rail axle 169. Movement of the J-hook 164 relative to rear axle 169 is controlled by means of a pair of push arms 176 and 178 which are pivotally connected to the J-hook 164 by means of a pin 180. The opposite end of push rods 176 and 178 are flattened and terminate in U-shaped notches 182 and 183, and the push arms slidably engage a pin 185 mounted on the actuator cylinder 91 and are maintained in slidable relationship with pin 185 by means of a spring 186. The U-shaped notches 182 and 183 are positioned to engage the reduced portions 86 of pin 85 on the end of piston rod 83 when the piston rod 83 is drawn into actuator 84.

Assuming that the road engaging wheels 12 are to be retracted and rail engaging wheels 14 are to be moved in a position to engage the rails 187, shown in FIG. 5, the actuator 84 is operated to retract the piston rod 83 from a position shown in FIGS. 2 and 3 to the position shown in FIG. 5. During the course of this step and prior to the time that the pin 85 engages push rods 176 and 178, the rail wheels 14 engage the rails. The weight of the vehicle upon the rail axle causes the air springs 152 to be slightly compressed so that the rail axle 169 moves to the position indicated by dot-dash lines in FIG. 3, which position will be above the hook portion 167 of the J-hook assembly 164 and which position will also permit movement of the J-hook away from the axle 169. As piston rod 83 approaches its terminal retracted position, pin 85 engages U-shaped notches 182 and 183 on the push rods 176 and 178, and continued retraction of the piston rod 83 overcomes the force of spring 186 and moves hook 164 to the position shown in FIG. 5. Additional air is now fed into air spring 152 so that the rail wheels will move to the approximate position shown in FIG. 5 and the air springs will act as a shock absorber, etc. for the vehicle while it is being operated as a rail type.

When it is desired to retract the rail wheels and lower the road engaging wheels, hydraulic fluid is fed to actuator 84 in the manner previously described, forcing piston rod 83 away from cylinder 91, thereby releasing push rods 176 and 178. The air pressure in the air spring 152 is now reduced by any convenient means, such as by opening a valve in the supply line. The weight of the vehicle compresses air spring 152 and lowers the vehicle until the end 167 of the J-hook 164 engages the periphery of the axle 169 through the action of spring 186. As the piston rod 93 is further extended by the actuator 84 the rod axle 56 is pivoted to its terminal road engaging position and locked in this position by means of locking pins 63 in a manner previously described. Thus the vehicle is again converted to the road type and the rail wheels are in the retracted position shown in FIGS. 2 through 4. While the vehicle is in this position air pressure is maintained within the air springs 152 to apply a sufficient force to arms 142 to prevent the rail axle 169 from bouncing in the J-hook 164 in response to vibrations of the vehicle.

The vehicle includes a rail wheel brake system comprising brake shoes 188 which are held in cooperative position relative to the wheels 14 by means of a brake shoe beam 190. Brake shoe beam 190 is suspended from transverse member 29 of the vehicle frame structure by means of brake beam hangers 191, the upper ends of which are pivotally connected to a bolt 192 fixed to the member 29 and the lower ends of which are pivotally connected to the brake beam by pins 193 projecting through yoke members 194 which are in turn connected to the brake beam. Rail brake arms 195 are adjustably coupled to opposite ends of the brake beam 190 by means including a rod 196 extending from one side of the vehicle to the other, that is, from one end of the brake beam to the other and short rods 197 welded to opposite ends of the brake beam. The ends of the rods 196, 197 project through elongated slots in the brake arms 195 and are provided with nuts for clamping the brake arm in adjusted position to the ends of the brake beam. The opposite ends of the rail brake arms 195 are coupled by means of pivot pins 199 to the rail brake levers 200. Suitable hydraulic cylinders 201 are mounted on rail brake arms 195 by brackets 202 and are coupled to the brake levers 200 by links 203. The rail brake levers 200 are pivotally mounted with respect to the journal box by means of a pivot pin 204. When the hydraulic cylinders 201 are actuated by the introduction of hydraulic fluid thereto from a suitable source, such as a pump (not shown), the rail brake levers 200 are pivoted about pivot pins 204 and the rail brake arms 195 are moved in the direction to move the brake shoes 188 out of engagement with the rail wheels 14 and against which they are normally spring biased. The position of the brake shoes 188 relative to the wheels 14 may be adjusted by loosening the nuts on the rods 196, 197 which engage in slots in the rail brake arms 195 in a manner well known in the art. The details of the rail brake assembly may be modified in any convenient manner to produce a brake system of a type known in the art.

From the foregoing description of the preferred embodiment of the invention it will be apparent that the objects heretofore enumerated and others have been accomplished and that there has been provided a novel road-rail vehicle and a novel wheel suspension for a road-rail vehicle which can be readily converted from a highway vehicle to a railway vehicle and vice versa, and which is simple in construction and reliable in operation.

While one illustrative embodiment of this invention has been shown and described, it is understood that the invention may be incorporated in other embodiments, for example, the rail axle assembly, instead of supported for pivotal movement relative to the frame structure, may be supported by linear vertical movement by replacing the rail wheel axle arm shown by members supported in suitable guides in the frame structure for linear vertical movement. It is the intention to hereby cover all embodiments in which the invention may be incorporated as the invention is defined by the claims hereof.

Having thus described my invention, what I claim is:

1. A road-rail vehicle comprising a vehicle frame structure, an axle assembly extending transversely of the vehicle and having wheels thereon, support means carried by said frame structure for supporting said axle assembly for movement relative to said frame structure between retracted and vehicle support positions, and pneumatic means operatively connected with said axle assembly and said frame structure for relatively moving said axle assembly and frame structure away from each other to position the wheels in their vehicle support position and for providing a shock absorbing means for said vehicle when said wheels are in their vehicle support position.

2. A road-rail vehicle comprising a vehicle frame structure, an axle assembly extending transversely of the vehicle and having wheels thereon, means for pivotally connecting said axle assembly to said frame structure for movement relative to said frame structure between retracted and vehicle support positions, and pneumatic means operatively connected with said axle assembly and said frame structure for relatively moving said axle assembly and frame structure away from each other to position the wheels in their vehicle support position and for providing a shock absorbing means for said vehicle when said wheels are in their vehicle support position.

3. A road-rail vehicle comprising a frame structure, a railway axle extending transversely of the vehicle and having rail wheels thereon, means for pivotally connecting said railway axle to said frame structure for movement relative to said frame structure between a retracted position and an operative rail engaging position in which it supports the vehicle, said means including pivot arm means connected with said axle assembly and pivotally connected with said frame structure, and pneumatic means connected with said frame structure and said railway axle for relatively moving said railway axle and said frame structure away from each other to position the rail wheels in their operative rail engaging position, said pneumatic means acting as a shock absorbing means for said vehicle when said rail wheels are in their operative rail engaging position.

4. A road-rail vehicle, as defined in claim 3, and wherein said pneumatic means comprises a bellows having one end operatively connected with said railway axle and the other end connected with said frame structure and means for supplying fluid under pressure to said bellows to longitudinally expand the latter to move said railway axle and rail wheels to their operative rail engaging position relative to said frame structure.

5. In a road-rail vehicle, as defined in claim 4, and including releasable locking means for locking said railway axle in its retracted position.

6. A road-rail vehicle, as defined in claim 4, and wherein said bellows is connected with said pivot arm means via a ball and a socket joint.

7. A road-rail vehicle comprising a vehicle frame structure, a road axle assembly having a pair of road wheels thereon, support means carried by said frame structure for supporting said road axle assembly and road wheels form movement relative to said frame structure between retracted and operative road engaging positions, actuating means operatively connected with said road axle assembly for moving said road engaging wheels between their retracted and operative road engaging positions, a railway axle assembly having rail wheels thereon, means pivotally connecting said railway axle assembly to said frame structure for movement relative to said vehicle frame structure between retracted and operative rail engaging positions independently of the movement of said road engaging wheels, and pneumatic means connected with said railway axle assembly and said frame structure for relatively moving said railway axle and rail wheels and frame structure away from each other to position the rail wheels in an operative rail engaging position and for absorbing the shocks of the vehicle while said rail wheels are in their rail engaging position.

8. A road-rail vehicle, as defined in claim 7, and wherein said pneumatic means comprises an air spring in the form of an air bellows having one end operatively connected with the frame structure and the other end operatively connected with said railway axle assembly and means for supplying air under pressure to the bellows for longitudinally expanding the same for relatively moving said rail wheels and the frame to position the rail wheels in their operative rail engaging position relative to the frame structure.

9. A road-rail vehicle, as defined in claim 7, and including releasable locking means for locking said railway axle assembly in its retracted position when said road wheels are in their operative ground engaging position.

10. A road-rail vehicle, as defined in claim 9, wherein said locking means comprises a member moveable between a first position in which it holds said railway axle assembly in a retracted position and a second position in which it permits said axle assembly to be relatively moved in a direction away from said frame structure, biasing means for biasing said member toward its first position, and means connected with said member and operatively associated with said actuating means for moving the same from its first position toward its second position in response to movement of said road wheels from their road engaging position toward their retracted position.

11. A road-rail vehicle, as defined in claim 10, and wherein said member is pivotally connected with said frame structure and has a J-shaped end which cooperably engages said railway axle assembly to hold the latter in a retracted position when in its first position.

12. A wheel suspension for a road-rail vehicle comprising a vehicle frame structure, axle supporting means adapted to be coupled to said frame structure, a road axle assembly pivotally coupled to said axle supporting means, hydraulic means for moving said road axle assembly relative to said axle supporting means, said hydraulic means comprising a hydraulic cylinder adapted to be coupled to said frame structure, a first piston slidably mounted in said cylinder, a tubular piston rod connected to said first piston and to said road axle assembly, means for introducing fluid under pressure into said cylinder at the side of said piston opposite to said piston rod, a tubular member projecting from said cylinder through said first piston and into said tubular piston rod, a second piston connected to said tubular member for forming a chamber within said piston rod therebetween and said first piston, and means for introducing fluid under pressure into said piston rod between said pistons.

13. A wheel suspension for a road-rail vehicle comprising a frame structure, axle supporting means connected with said frame structure, an axle assembly having wheels thereon, means for pivotally connecting said axle assembly to said axle supporting means for movement relative to said frame structure, hydraulic means for pivoting said axle assembly between a terminal lowered operating position and a terminal retracted position, said hydraulic means comprises a first hydraulic cylinder, a first piston slidably mounted in said first cylinder, a second piston concentric with said first cylinder and secured to said first cylinder, an inner cylinder concentric with said first cylinder and in fluid sealing relationship with said second piston, means connecting said inner cylinder to said first piston, means connecting said inner cylinder with said axle assembly, means for introducing fluid under pressure between said first piston and said first cylinder whereby said road axle is moved to its terminal lowered operating position, and means for introducing fluid under pressure into said inner cylinder whereby said road axle is raised to its terminal retracted position.

14. A wheel suspension for a road-rail vehicle, as defined in claim 13, and wherein said means for connecting said inner cylinder with said road axle assembly includes an actuating member connected with said axle assembly and a yieldable member interposed between the actuating member and said inner cylinder to absorb vibrations.

15. A wheel suspension for a road-rail vehicle, as defined in claim 14, and wherein said yieldable member is a spring.

16. A wheel suspension for a road-rail vehicle, as defined in claim 13, wherein said axle assembly is a road axle assembly having road wheels thereon, and wherein said axle supporting means comprising a spring connected to said frame structure and a pedestal means connected with the spring means to which the axle assembly is pivotally connected.

References Cited by the Examiner

UNITED STATES PATENTS

| | | | |
|---|---|---|---|
| 1,091,125 | 3/1914 | Eickemeyer | 105—215 X |
| 1,113,370 | 10/1914 | Ostendorf | 105—215 X |
| 1,801,469 | 4/1931 | Wagner | 105—215 |
| 1,827,898 | 10/1931 | Moore | 105—215 |
| 1,938,049 | 12/1933 | Serrano | 105—215 |
| 2,016,626 | 10/1935 | Constantinesco | 105—215 |
| 2,039,489 | 5/1936 | Messick | 105—215 |
| 2,889,785 | 6/1959 | Browne | 105—215 |
| 3,002,469 | 10/1961 | Wanner | 105—215 |
| 3,108,513 | 10/1963 | Koshobu | 105—215 |
| 3,198,137 | 8/1965 | White | 105—215 |

ARTHUR L. LA POINT, *Primary Examiner.*

H. BELTRAN, *Assistant Examiner.*